(12) United States Patent
Kobel (10) Patent No.: US 7,353,817 B2
(45) Date of Patent: Apr. 8, 2008

(54) SAW ACCESSORY FOR AERIAL WORK PLATFORM

(75) Inventor: Korry D. Kobel, Chambersburg, PA (US)

(73) Assignee: JLG Industries, Inc., McConnellsburg, PA (US)

( * ) Notice: Subject to any disclaimer, the term of this patent is extended or adjusted under 35 U.S.C. 154(b) by 352 days.

(21) Appl. No.: 11/252,593

(22) Filed: Oct. 19, 2005

(65) Prior Publication Data

US 2006/0037816 A1 Feb. 23, 2006

Related U.S. Application Data

(63) Continuation of application No. 10/802,917, filed on Mar. 18, 2004, now Pat. No. 7,055,650, which is a continuation-in-part of application No. 10/145,808, filed on May 16, 2002, now Pat. No. 6,823,964.

(60) Provisional application No. 60/291,313, filed on May 17, 2001.

(51) Int. Cl.
*B24D 1/02* (2006.01)

(52) U.S. Cl. .................. 125/12; 125/13.01; 125/14; 182/2.2; 182/129; 182/131

(58) Field of Classification Search ............... 125/12, 125/14, 13.01, 13.03; 451/354, 439; 182/2.1, 182/2.2, 2.3, 129, 131, 222
See application file for complete search history.

(56) References Cited

U.S. PATENT DOCUMENTS

| | | | |
|---|---|---|---|
| 2,691,478 A | 10/1954 | Frankel | |
| 2,965,094 A | 12/1960 | Carrier | |
| 3,722,497 A | 3/1973 | Hiestand et al. | |
| 3,763,845 A | 10/1973 | Hiestand et al. | |
| 4,181,194 A | 1/1980 | Bassett et al. | |
| 4,243,118 A | 1/1981 | Landry | |
| 4,407,392 A | 10/1983 | Lazzari | |
| 4,560,029 A | 12/1985 | Dalmaso | |
| 4,705,140 A | 11/1987 | Dudley et al. | |
| 4,751,865 A * | 6/1988 | Buckalew | 83/745 |
| 4,756,298 A | 7/1988 | Spiegelberg | |
| 4,832,412 A | 5/1989 | Bertrand | |
| 4,836,494 A | 6/1989 | Johnsen | |
| 4,919,283 A | 4/1990 | Riley et al. | |

(Continued)

FOREIGN PATENT DOCUMENTS

GB 2 202 788 10/1988

(Continued)

*Primary Examiner*—Eileen P. Morgan
(74) *Attorney, Agent, or Firm*—Nixon & Vanderhye P.C.

(57) ABSTRACT

A wall saw accessory is provided for an aerial work platform, where a wall saw is movably affixed on a track secured to a wall to be sawed. The accessory includes a saw/track manipulator fixable to the aerial work platform. The saw/track manipulator movably supports the track and saw and enables positioning of the saw and track to and from a working position. A hydraulic power source is coupled with a water supply to provide hydraulic power and coolant flow to the wall saw. In one arrangement, the accessory additionally incorporates an onboard pressure washer, which serves to streamline the process and maintain a clean work area. The accessory may be attached to a lift vehicle including a chassis supporting an onboard water supply.

9 Claims, 6 Drawing Sheets

U.S. PATENT DOCUMENTS

| | | |
|---|---|---|
| 4,936,284 A | 6/1990 | Johnson |
| 4,986,252 A | 1/1991 | Holmes et al. |
| 4,998,775 A | 3/1991 | Hollifield |
| 5,036,949 A | 8/1991 | Crocker et al. |
| 5,092,426 A | 3/1992 | Rhodes |
| 5,230,270 A | 7/1993 | Bertrand |
| 5,295,557 A | 3/1994 | Taylor |
| 5,388,661 A | 2/1995 | Hood, Jr. |
| 5,588,418 A | 12/1996 | Holmes et al. |
| 5,645,040 A | 7/1997 | Bieri jun |
| 5,887,579 A | 3/1999 | Eriksson et al. |
| 6,092,623 A | 7/2000 | Collavino |
| 6,158,817 A | 12/2000 | Bertrand |
| 6,170,478 B1 | 1/2001 | Gorder |
| 6,286,905 B1 | 9/2001 | Kimura et al. |
| 6,330,931 B1 | 12/2001 | Baillargeon et al. |
| 6,823,964 B2 | 11/2004 | Goode |
| 6,863,062 B2 | 3/2005 | Denys |
| 2002/0195094 A1 | 12/2002 | Crawford |

FOREIGN PATENT DOCUMENTS

| | | |
|---|---|---|
| JP | 2-160504 | 6/1990 |

* cited by examiner

SAW ACCESSORY FOR AERIAL WORK PLATFORM

CROSS-REFERENCES TO RELATED APPLICATIONS

This is a continuation of U.S. patent application Ser. No. 10/802,917, filed Mar. 18, 2004, now U.S. Pat. No. 7,055,650; which is a continuation-in-part of U.S. patent application Ser. No. 10/145,808, filed May 16, 2002, now U.S. Pat. No. 6,823,964; which claims the benefit of U.S. Provisional Patent Application Ser. No. 60/291,313, filed May 17, 2001; the entire contents of which are hereby incorporated by reference in this application.

STATEMENT REGARDING FEDERALLY SPONSORED RESEARCH OR DEVELOPMENT (NOT APPLICABLE)

BACKGROUND OF THE INVENTION

The present invention relates generally to aerial work platforms and, more particularly, to a wall saw accessory cooperable with an aerial work platform to facilitate a wall sawing operation.

It may be desirable in the building construction industry to cut openings in exterior walls and the like, including those made of concrete, stone, and other hard materials. Such cuts are best made using a saw mounted to a carriage for movement along a track attached to the wall. The carriage is typically guided along the track by a plurality of rollers or other guide elements bearing against contact surfaces on opposite sides of the track.

In order to mount the saw for a cutting operation, several operations are typically required in order to secure the track to the wall and mount the saw on the track. This operation is particularly troublesome when a cut is to be performed in an exterior wall at a significant height.

Additionally, in order to maintain the integrity of the saw blade during the saw operation, the wall saw typically requires a source of coolant such as water to be applied to the saw blade during use. Accessibility to the coolant source can be an obstacle to efficient operation.

Still further, the cutting operation can leave a residue on the cut surface, which ultimately requires cleaning via a pressure washer or the like. Particularly at height, a pressure washer may be burdensome to manipulate, and, like the coolant for the wall saw, the fluid source for the pressure washer can create additional problems.

BRIEF SUMMARY OF THE INVENTION

In order to overcome these drawbacks of existing wall saw systems, the present invention provides a wall saw accessory for an aerial work platform that facilitates manipulation of the saw and track while streamlining the saw operation. Additionally, the wall saw accessory of the present invention enables a single operator to perform the wall sawing operation more efficiently than an entire crew using conventional arrangements.

In an exemplary embodiment of the invention, a wall saw accessory for an aerial work platform is cooperable with a wall saw is movably affixed on a track secured to a wall to be sawed. The wall saw accessory includes a saw/track manipulator fixable to the aerial work platform, where the saw/track manipulator movably supports the track and saw and enables positioning of the saw and track to and from a working position. Hydraulic power from the machine's hydraulic system may be coupled with a water supply to provide hydraulic power and coolant flow to the wall saw. Alternatively, a separate hydraulic power source may be mounted on the aerial work platform.

Preferably, the saw/track manipulator includes a bottom bracket securable to the aerial work platform and supporting a lateral rail; a sliding bracket movably mounted on the lateral rail; a telescope assembly secured to the sliding bracket, where the telescope assembly includes a hydraulically assisted lifting arm; and a rotatable track support assembly attached to the lifting arm of the telescope assembly via at least one structural link. The track support assembly includes holding brackets for holding the track during installation and removal.

The saw/track manipulator is preferably constructed to enable positioning of the saw and track with five degrees of freedom. Moreover, the hydraulic power source may be coupleable with the saw via a quick-connect coupler.

The wall saw accessory may additionally include a pressure washer system connected with the hydraulic power source. In this context, the pressure washer system may comprise a spray nozzle, a hose, and a pressure adjustment mechanism. Moreover, the hydraulic power source may further include a toggle switch for the wall saw and the pressure washer system such that only one is operable at a time.

In another exemplary embodiment of the invention, a lift vehicle includes an aerial work platform, and the wall saw accessory of the invention coupled to the aerial work platform. The vehicle may include a chassis, wherein the water supply is at least one water tank mounted to the chassis, and preferably two water tanks saddle mounted on the chassis.

In still another exemplary embodiment of the invention, a method of constructing a lift vehicle with wall saw accessory includes the steps of movably affixing a wall saw on a track; securing the wall saw accessory to an aerial work platform by fixing a saw/track manipulator to the aerial work platform, the saw/track manipulator movably supporting the track and saw and enabling positioning of the saw and track to and from a working position; and coupling a hydraulic power source with a water supply, the hydraulic power source providing hydraulic power and coolant flow to the wall saw.

Other exemplary embodiments of the invention include a coolant circuit integrated with the aerial work platform and a pressure washer system utilizing the coolant circuit.

BRIEF DESCRIPTION OF THE DRAWINGS

These and other aspects and advantages of the present invention will be described in detail with reference to the accompanying drawings, in which.

DETAILED DESCRIPTION OF THE INVENTION

An aerial work platform provides a convenient way for an operator to work at heights. Typically, a platform includes a floor upon which the operator can stand and a guard rail about its perimeter. Tools and other functional apparatus may be integrated with the guard rail or floor to facilitate use by the operator. The platform itself is raised and lowered by a suitable lifting apparatus, such as a boom lift or scissors lift or the like. Typically, a position of the vehicle as well as its platform can be controlled by the operator from the platform.

Figure 1:
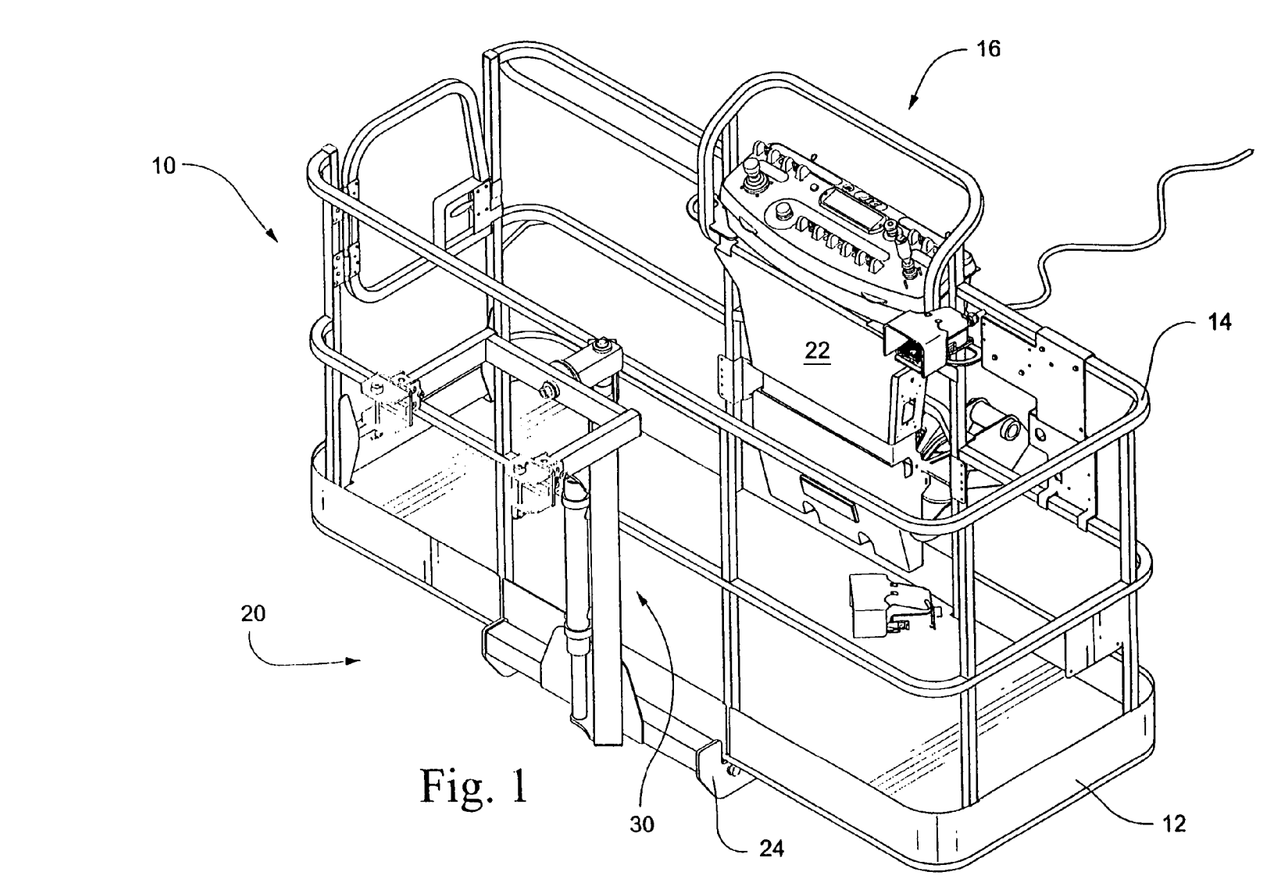
FIG. 1 is a perspective view of the saw/track manipulator of the wall saw accessory of the invention attached to an aerial work platform.

FIG. 1 is an exemplary perspective view of an aerial work platform 10. The platform 10 includes a floor or base 12 and a guard rail 14 about its perimeter. A control unit 16 is integrated with the guard rail 14.

Figure 2:
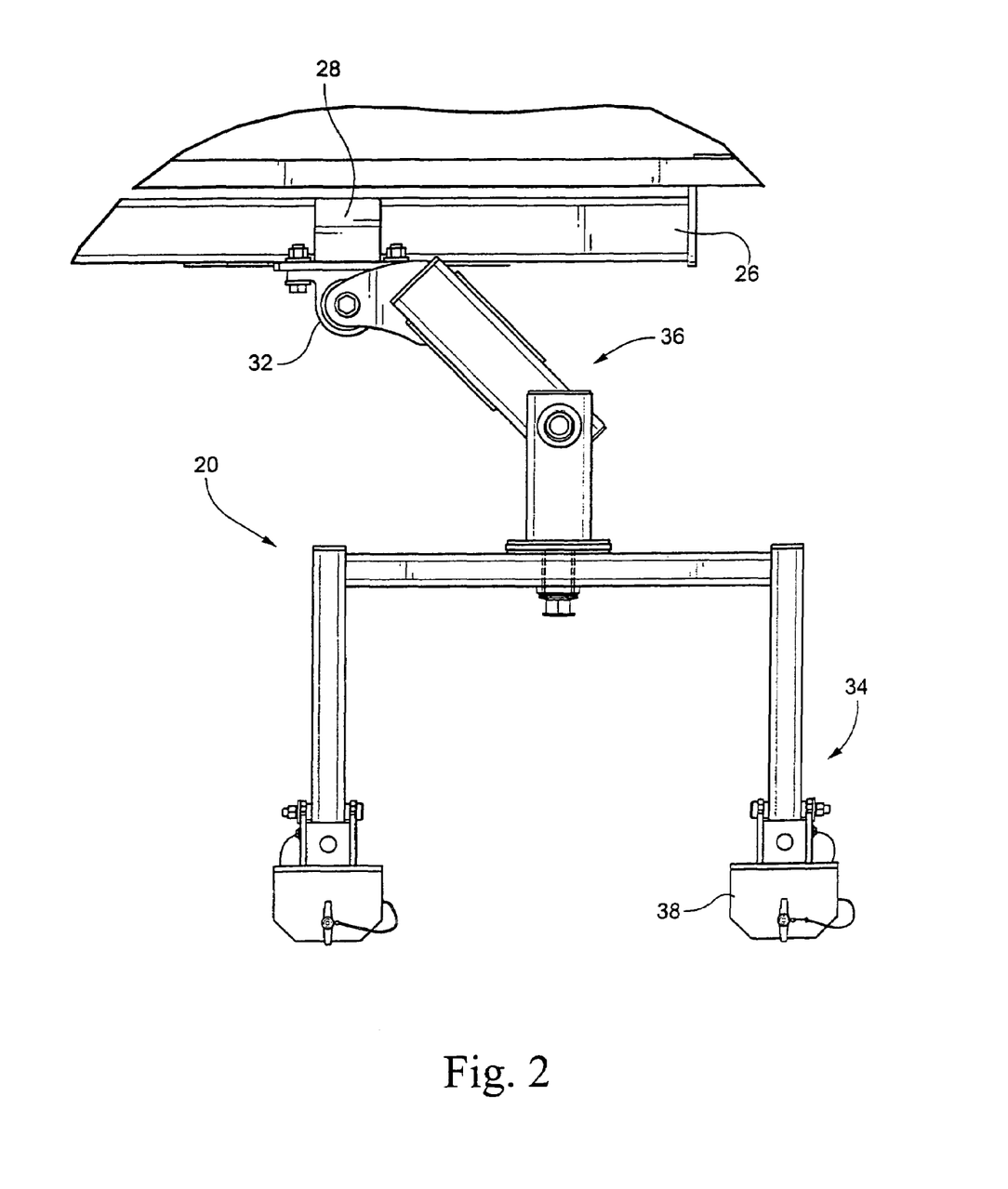
FIG. 2 is a plan view of the saw/track manipulator.

With continued reference to FIG. 1 and with reference to FIG. 2, the wall saw accessory of the present invention generally includes a saw/track manipulator 20 attachable to the aerial work platform 10. As will be described in more detail below, the saw/track manipulator 20 movably supports a track and wall saw and enables positioning of the saw and track to and from a working position. The accessory additionally includes a hydraulic power source 22 shown schematically in FIG. 1 either diverted from the machine's hydraulic pump, which normally powers the drive system, or as a separate unit mounted on the aerial work platform 10. The hydraulic power source 22 is coupled with a water supply and provides hydraulic power and coolant flow to the wall saw.

The saw/track manipulator 20 is a multiple degree of freedom (preferably five-degree of freedom) mechanical device that aids in the positioning of both the saw and track section simultaneously. The manipulator includes a bottom bracket 24 (FIG. 1) secured to the aerial work platform 10 and supporting a lateral rail 26 (FIG. 2). A sliding bracket 28 may be movably mounted on the lateral rail 26 for side-to-side movement across the lateral rail 26. Alternatively, the bracket 28 may be fixed. A telescope assembly 30 is secured to the sliding bracket 28 and includes a hydraulically assisted lifting arm 32. A rotatable track support assembly 34 is attached to the lifting arm 32 of the telescope assembly 30 via at least one structural link 36. The track support assembly 34 includes holding brackets 38 for holding the track during installation and removal.

With this assembly, the manipulator is constructed to enable positioning of the saw and track with preferably five degrees of freedom, including hydraulically assisted vertical movement (preferably, +/−four inches) with manual adjustment in and out, left and right, and lockable 360° rotation of the saw and track via the track support assembly 34. A fifth joint via the structural link 36 provides for angular and horizontal adjustment of the track to the wall. A simple tether-mounted pendant or other suitable structure controls the vertical cylinder motion. Once positioned, the track is secured to the wall in a conventional manner and disconnected from the manipulator 20 for the sawing process. The manipulator 20 may be provided with a stow cradle to prevent it from interfering with the sawing process.

Figure 3:
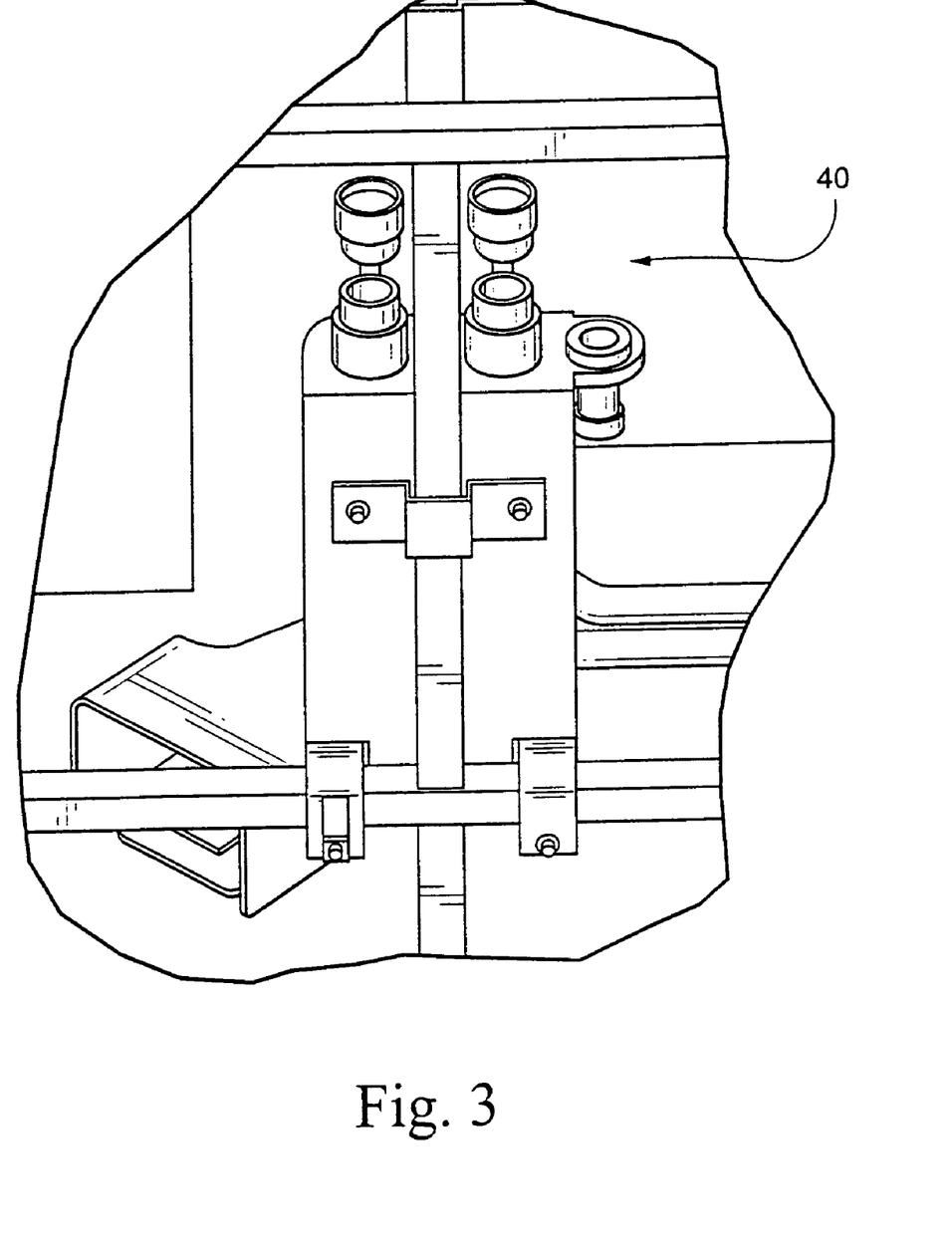
FIG. 3 is an exemplary schematic illustration of the saw power and water hose quick connect self-detaching fittings.

The hydraulic power source 22 may itself form part of an accessory assembly providing multiple energy power sources for air or water powered tools. In one arrangement, the power sources may be powered either from an onboard engine driven generator or from an outside AC power outlet. With reference to FIG. 3, the hydraulic power source is preferably coupleable with the wall saw via a known quick-connect coupler 40 or the like. The quick-connect coupler is preferably provided with an emergency disconnect feature, where the coupling is disconnected when the operator attempts to move the machine while it is connected to the saw mounted on the wall. The power source 22 preferably provides hydraulic power to the wall saw and incorporates an onboard water source (described below) required for wall sawing and pressure washing. In one arrangement, the hydraulic power consists of a maximum of 25 GPM at 2500 psi. This flow is provided by the machine function pump and is adjustable by the user at the accessory control box from a minimum of 10 GPM up to the maximum flow. The cooling water for the saw is also used to cool the returning hydraulic oil before it returns to its tank.

This power arrangement allows for the saw operator to be independent on the site by not tethering the mobile unit to fixed hydraulic and water supplies. The chance of hose damage due to construction site traffic is also significantly reduced or eliminated because all hoses from source to user are managed on the machine.

Figure 4:
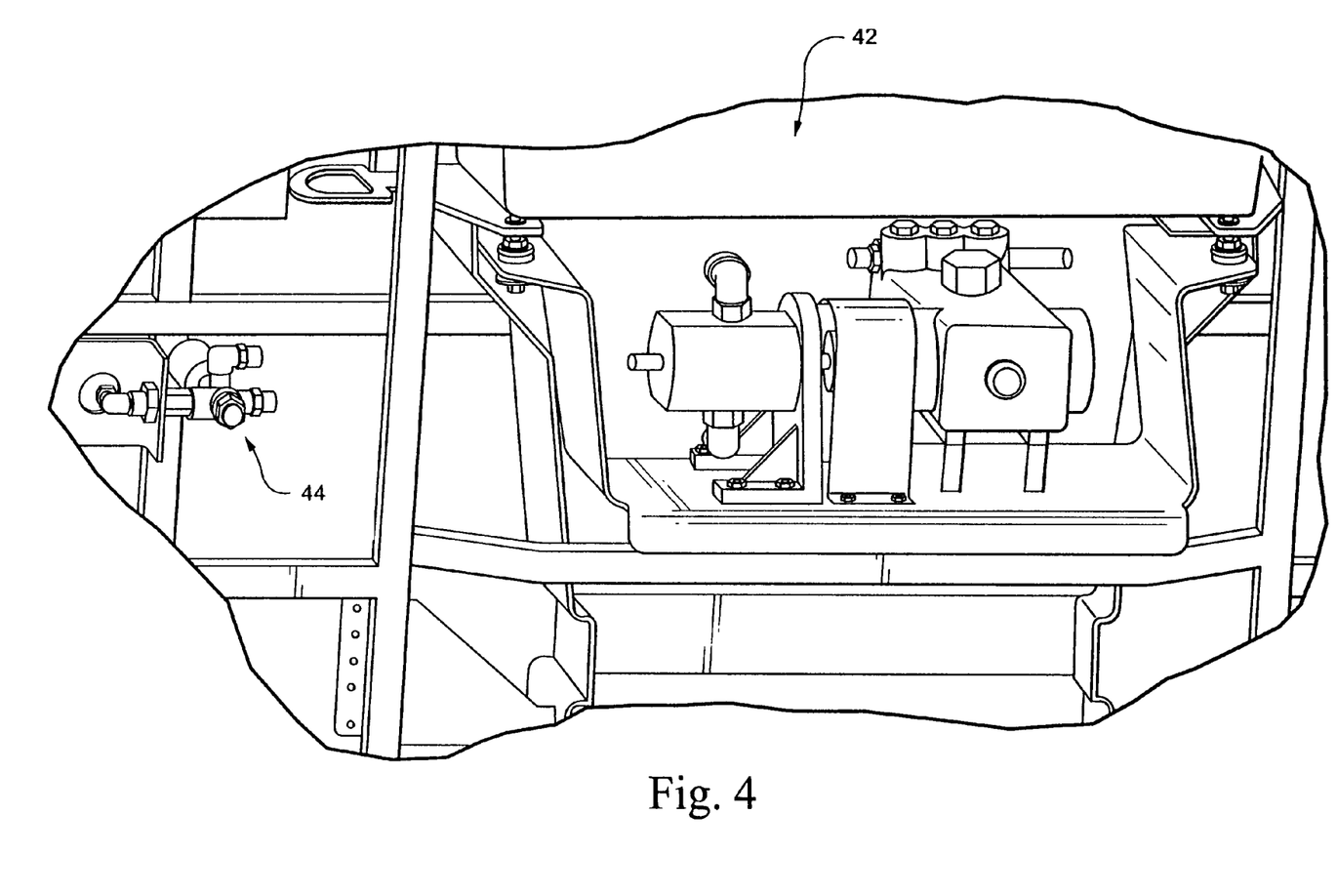
FIG. 4 illustrates the platform-mounted pressure washer.
Figure 6:
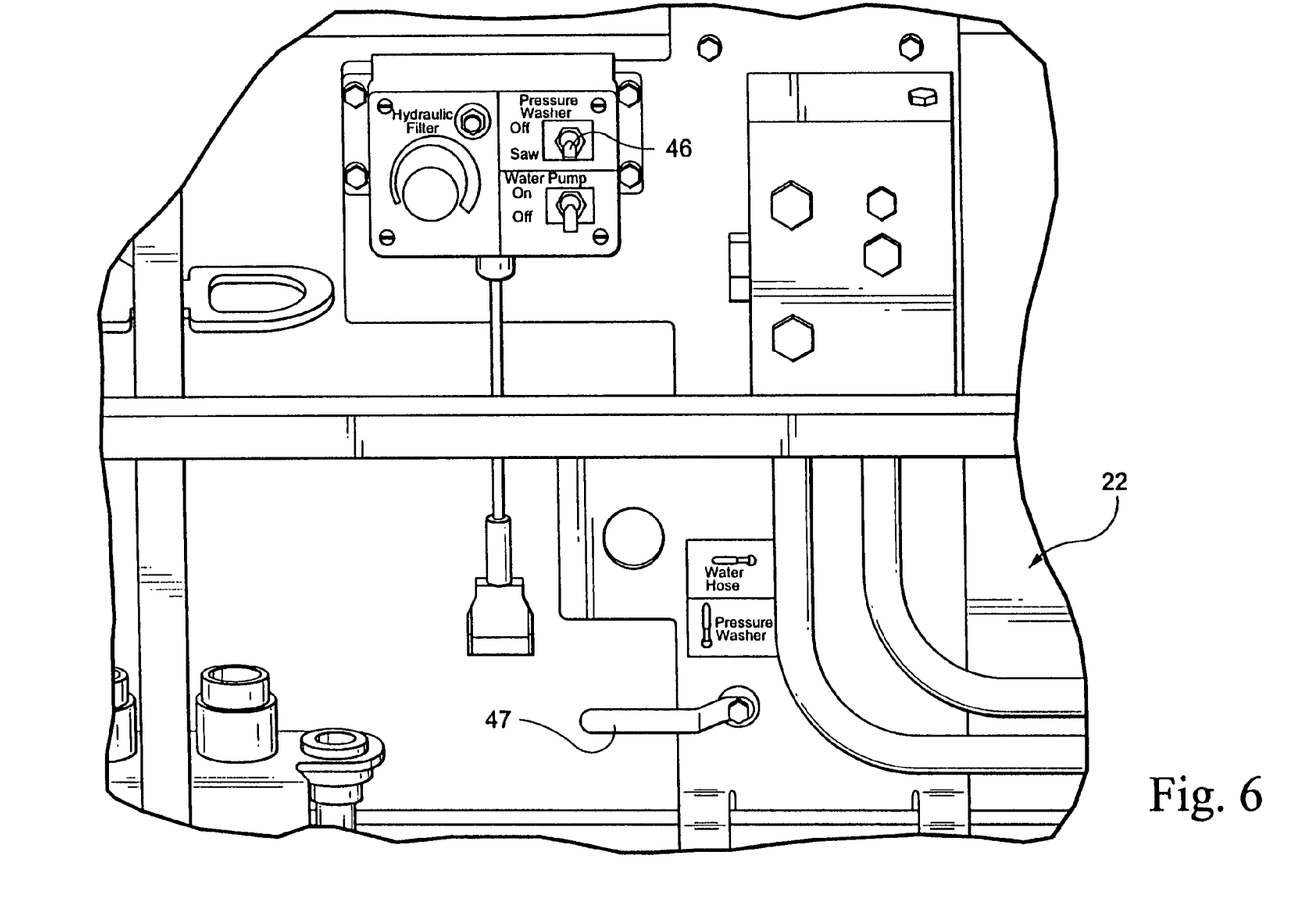
FIG. 6 is a schematic saw activation diagram.

FIG. 4 illustrates a pressure washer system 42 also connectable to the hydraulic power source 22. The pressure washer system 42 includes a hydraulically driven high pressure water pump, a conventional spray nozzle, a hose, and a pressure adjustment mechanism 44. As shown in FIG. 6, the hydraulic source 22 further includes a toggle switch 46 for the wall saw and the pressure washer system such that only one is operable at a time. A combination of the water pump coupled with the source of hydraulic power 22 and a water supply may serve generally as a coolant circuit providing coolant flow to any aerial work platform accessory.

The onboard pressure washer 42 is a hydraulically driven unit that provides preferably 4 GPM at a user-selected operating pressure of between approximately 1000 psi and a maximum of 3500 psi. The pressure washer 42 is mounted on the platform where the operator can easily adjust the washing pressure on the fly. Activation of the pressure washer is achieved via a simple two-step process. Once the saw is turned off, the manual water diverter valve 47 is turned to the pressure washer selection, and the power switch for the pressure washer is turned on. See, for example, steps 1 and 3 in FIG. 6 (discussed in detail below).

Figure 5:
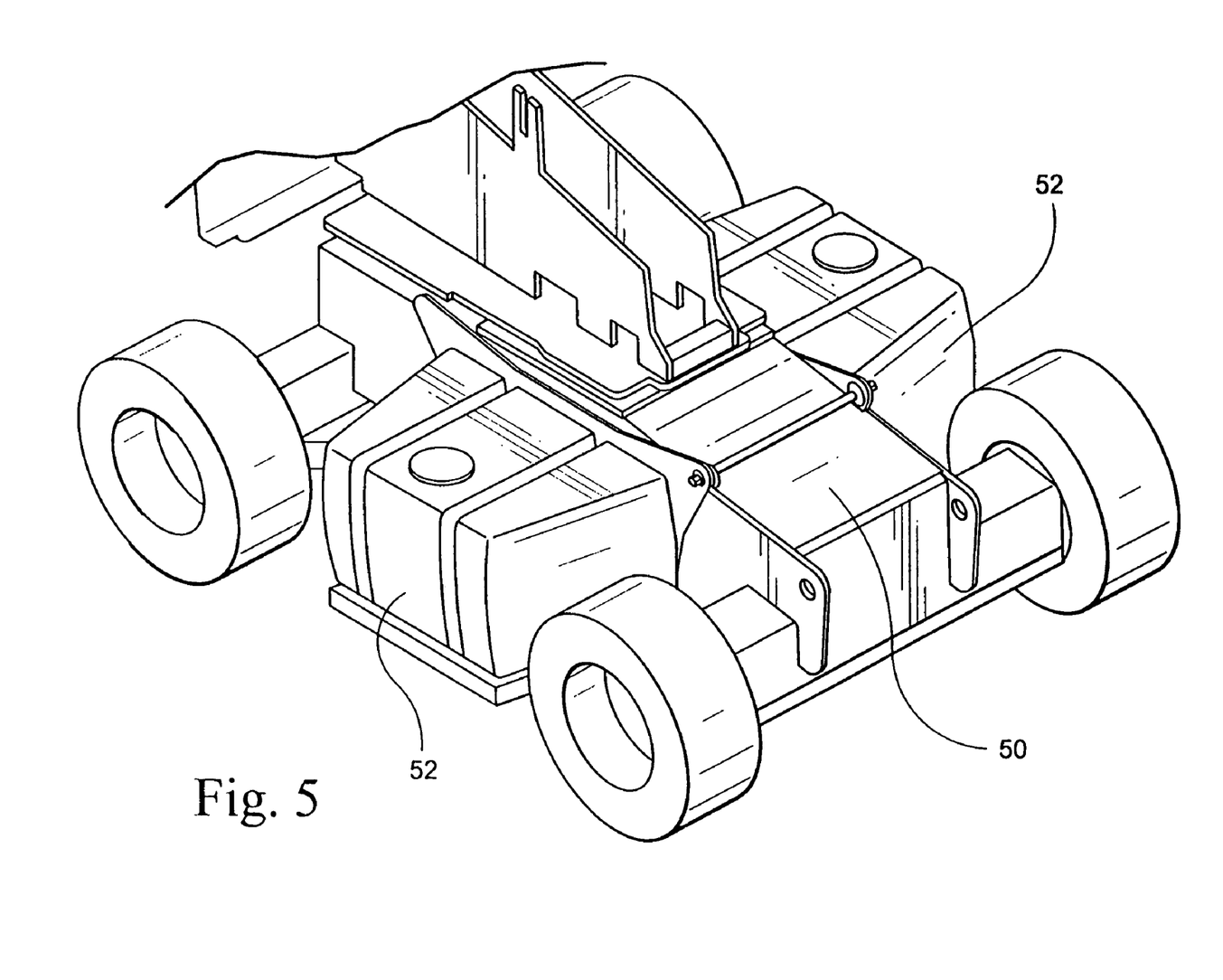
FIG. 5 shows the lift vehicle chassis and saddle mounted water tanks.

FIG. 5 illustrates the chassis 50 of a lift vehicle incorporating the wall saw accessory according to the present invention. As shown in FIG. 5, the onboard water source for the wall saw accessory preferably includes two "saddle" mounted water tanks 52 on the chassis 50. In a preferred arrangement, the water tanks 52 are 150 gallon water tanks. Water is pumped from the tanks 52 to the platform at a constant flow rate, preferably about 4 GPM.

In operation, the saw is first connected to generally the midpoint of the desired track length, the saw and track themselves may be of conventional construction. This subassembly is then secured to the manipulator 20 via the holding brackets 38 before ascending the platform 12 to the cut location. The operator then lays out the first cut and mounts and levels conventional track brackets to the wall. Position controls on the aerial work platform are then used to position the saw/track assembly in the necessary orientation adjacent the mounted brackets. Final adjustments are accomplished using the manipulator 20 via its five degrees of freedom to finally align the track with the track brackets secured to the wall. Locking bolts are then installed to secure the track to the bracket.

Subsequently, the operator disconnects the manipulator from the track, and the manipulator 20 is returned to its stowed position. The track/bracket connection bolts can then be fully secured for the sawing operation. Resultant binding, due to the weight transfer from the machine to the wall, may require slight vertical adjustments via the telescope assembly 30 to more easily accomplish the separation.

The operator then installs the appropriate blade and guard for the saw, makes the required power and water connections, and positions the platform at a safe working distance from the saw. With reference to FIG. 6, the water supply diverter valve is placed in the water hose position, and the water pump switch is activated. With water flowing to the blade, the saw power switch is then activated, and the desired hydraulic flow rate is selected. The sawing operation then proceeds until the cut is finished.

Upon completion of the first cut, the operator reverses the start-up procedure: the hydraulic power is switched off, the water pump is turned off, and the saw guard and blade are removed. The manipulator 20 is then reattached to the saw and track, and the track/bracket bolts are removed. The operator can then prepare for the next cut in the same manner as the first, moving the saw/track assembly to the next cut location. The wall and equipment can be power washed using the onboard power washer at any time the saw is not being operated.

With the hydraulic power source, the manipulator and the pressure washer of the wall saw accessory according to the invention, overall operating costs for sawing operations can be reduced. The system provides time savings, reduced or eliminated back charges, improved quality, reduced worker turnover, reduced maintenance costs, and the ability to almost double the output of a two-man sawing crew. The time savings begin with the reduced set up time at the start of the job and continue throughout the working day from the conveniences of the accessory functionality. Steady productivity throughout a work day results from the lessened operator strain while using the manipulator. Traditionally, the operator would have to handle the up to 10-foot section of track and the 100+ pound saw individually and for each cutting sequence. With the saw accessory including the saw/track manipulator, once the saw and track are installed at the beginning of a work day, the operator is not required to lift the saw again until the end of the day when it is stowed for transport.

The integrated pressure washer allows for the operator to maintain a clean working area and tools, also saving time by not forcing the crew to wait until the slurry has dried before attempting to remove it from the wall and at the same time eliminating possible back charges from doing so. Quality is improved in both the short and long terms from the use of the manipulator in the positioning of the cumbersome saw and track. Work days will not require as much effort, which will add up to equal more experienced saw operators. The per man productivity can also increase by essentially turning a two-man operation into one easily managed by a single person. Furthermore, maintenance costs will also be reduced by the ability to rent readily equipped machines from local rental facilities.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of cutting a wall with a wall saw accessory attached to an aerial work platform, the wall saw accessory including a wall saw that is movably affixed on a track securable to the wall to be sawed, the method comprising:
   (a) connecting the wall saw and track to a saw/track manipulator attached to the aerial work platform, the saw/track manipulator movably supporting the wall saw and track;
   (b) manipulating the wall saw and track with the saw/track manipulator to position the wall saw and track to a working position;
   (c) securing the wall saw and track to the wall and disconnecting the wall saw and track from the saw/track manipulator;
   (d) activating a hydraulic power source coupled with a water supply and providing hydraulic power and coolant flow to the wall saw; and
   (e) cutting the wall by operating the wall saw along the track.

2. A method according to claim 1, further comprising, prior to step (b), pre-positioning the wall saw and track using position controls on the aerial work platform.

3. A method according to claim 1, further comprising, after step (c), installing an appropriate blade and guard for the saw, connecting power and water connections, and positioning the aerial work platform a safe working distance from the saw.

4. A method according to claim 1, wherein step (d) is practiced by selecting a desired hydraulic flow rate.

5. A method according to claim 1, wherein the wall saw accessory includes a pressure washer system connected with the hydraulic power source, the method further comprising power washing at least one of the wall, the wall saw and the track using the pressure washer system.

6. A method enabling a single operator to perform a wall sawing operation, the method comprising:
   manipulating a wall saw and track with a saw/track manipulator attached to an aerial work platform to position the wall saw and track to a working position;
   securing the wall saw and track to a wall to be sawed;
   activating a hydraulic power source coupled with a water supply and providing hydraulic power and coolant flow to the wall saw; and
   cutting the wall by operating the wall saw along the track.

7. A wall sawing method comprising:
   connecting a wall saw and track to a saw/track manipulator attached to an aerial work platform, the saw/track manipulator movably supporting the wall saw and track;
   pre-positioning the wall saw and track adjacent a wall to be sawed using position controls on the aerial work platform;
   finely manipulating the wall saw and track with the saw/track manipulator to position the wall saw and track to a working position;
   securing the wall saw and track to the wall and disconnecting the wall saw and track from the saw/track manipulator; and
   cutting the wall by operating the wall saw along the track.

8. A wall sawing method according to claim 7, further comprising providing coolant flow to the wall saw during the cutting step.

9. A wall sawing method according to claim 8, wherein the step of providing coolant flow is practiced by activating a hydraulic power source coupled with a water supply.

* * * * *